Patented Mar. 1, 1927.

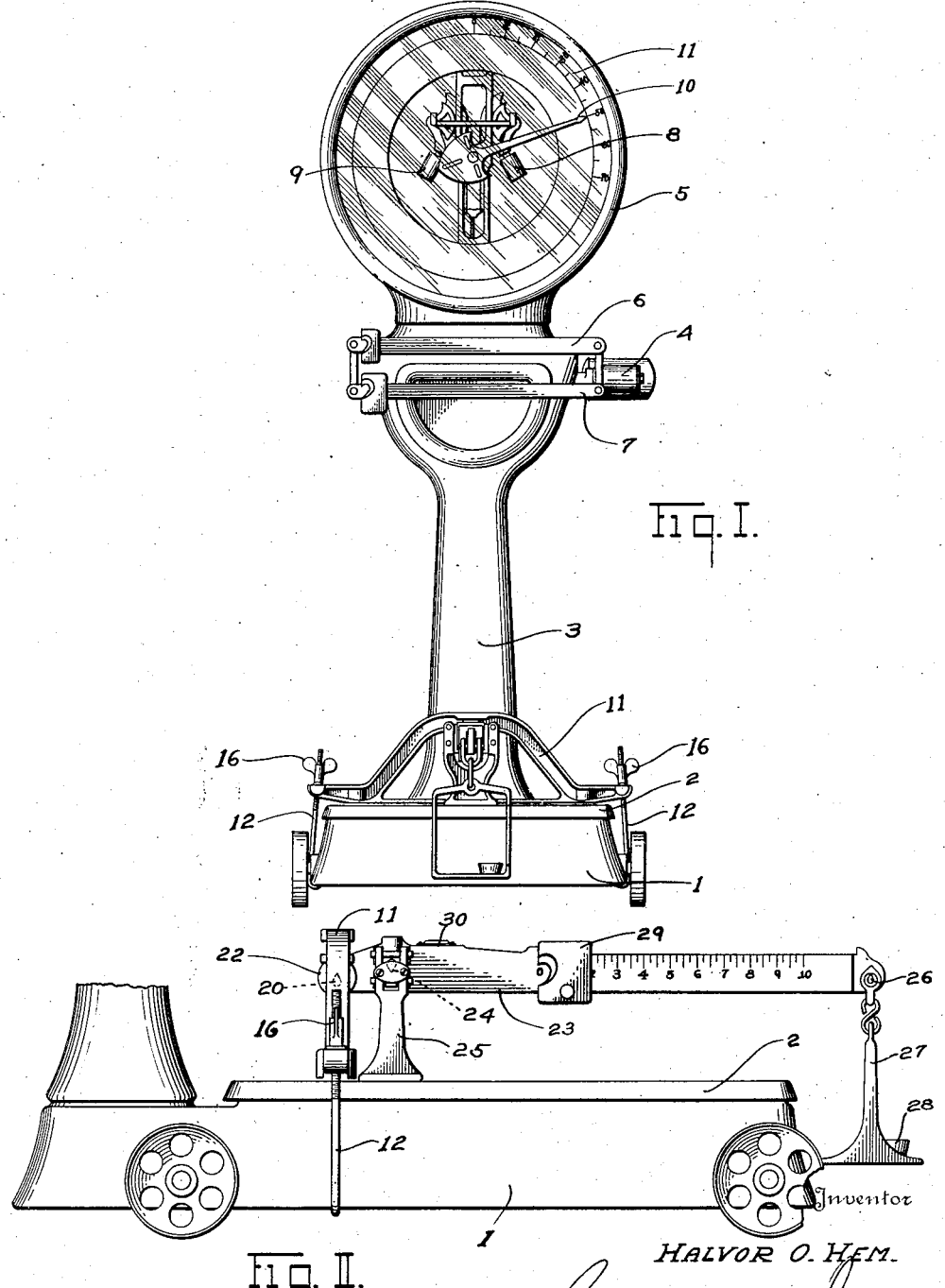

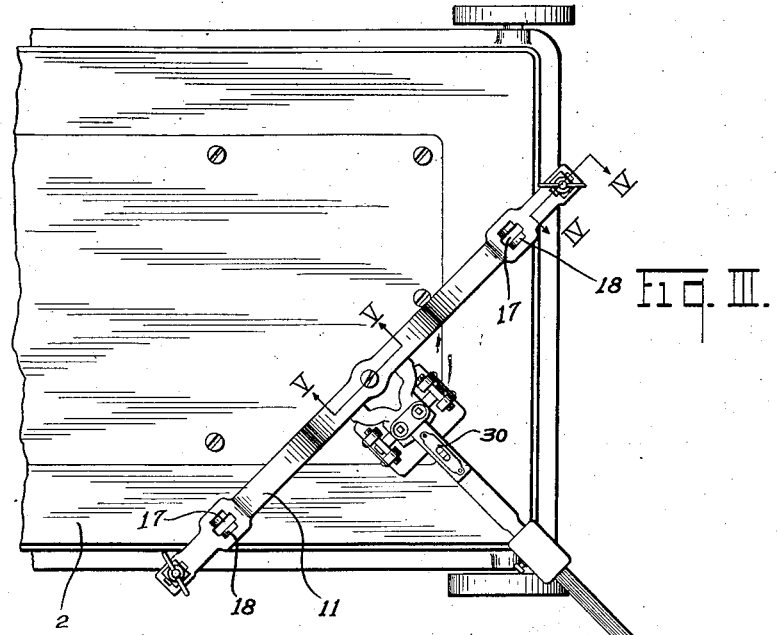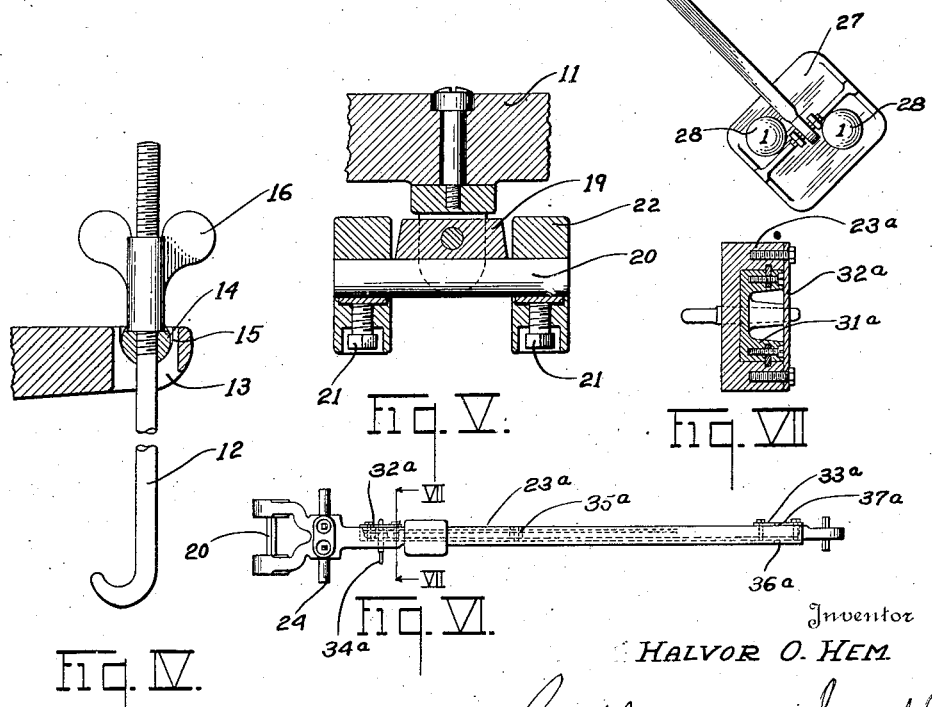

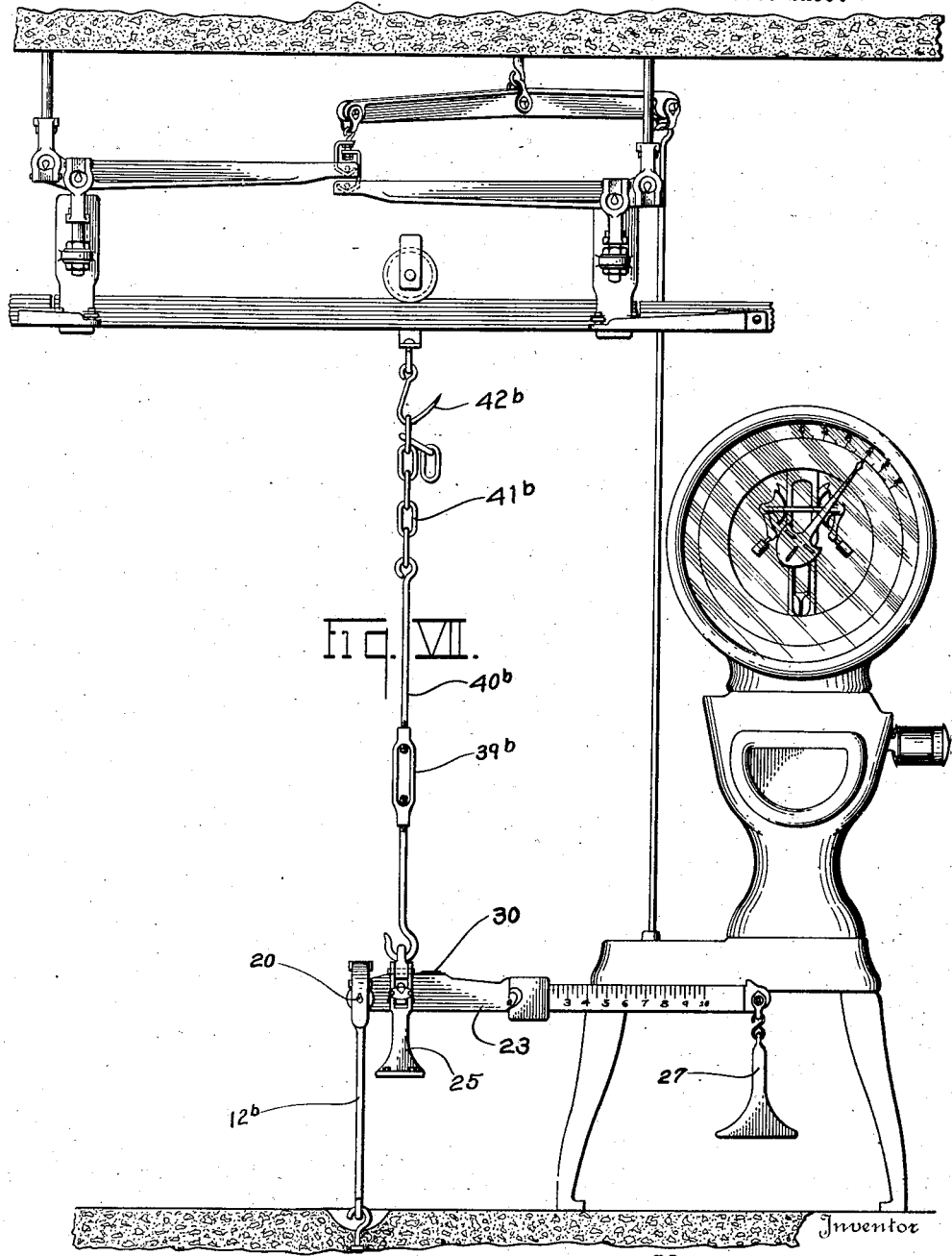

1,619,122

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

TESTING DEVICE.

Application filed September 11, 1922. Serial No. 587,268.

The transportation from place to place of several hundred pounds of standard test weights such as are used for testing heavy capacity scales is a matter involving considerable expense and great inconvenience. Sealers and scale service men who carry such weights as baggage are often delayed because of the non-arrival of the test weights at the place where a scale is to be tested, and where scales are located in remote districts the cost of transporting such weights for the purpose of making periodical tests is almost prohibitive. This invention has for its principal object the provision of a portable testing device of such compactness and such light weight that it may be carried in hand baggage, but which is nevertheless capable of testing scales having capacities of several hundred pounds.

Another object of the invention is the provision of means for expeditiously attaching the testing device to the scale to be tested so that it will operate without any binding action.

Another object of the invention is to provide a testing device capable of being applied to scales having platforms of various sizes and types.

Another object of the invention is the provision of a testing device capable of testing overhead track scales as well as platform scales.

Another object of the invention is the provision of a testing device by means of which the 1 lb. weights ordinarily carried by sealers and scale service men for testing counter scales of low capacity may be used to test scales of relatively great capacity.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view showing a scale of the portable type with the testing device of my invention applied thereto;

Figure II is an enlarged fragmentary side elevational view showing the testing device applied to the platform of a scale of the portable type;

Figure III is a plan view showing the testing device applied to the corner of the platform of a scale of the portable type;

Figure IV is an enlarged fragmentary sectional view taken substantially on the line IV—IV of Figure III, showing part of the means employed for connecting the device to the frame of a scale;

Figure V is an enlarged fragmentary sectional view taken substantially on the line V—V of Figure III;

Figure VI is a plan view showing a modified form of lever;

Figure VII is a vertical sectional view taken substantially on the line VII—VII of Figure VI; and Figure VIII is an elevational view showing the device employed for testing an overhead track scale.

Referring to the drawings in detail and particularly to Figures I and II thereof, the testing device is shown as applied to an automatic scale of a well known and widely used type, having a base 1 within which are housed levers (not shown) that support the platform 2. Upon the rear end of the base 1 is a column 3 supporting beam mechanism 4 and a head 5 containing automatic load-offsetting mechanism, the beam mechanism and automatic load-offsetting mechanism being connected to the levers which support the scale platform. The beam mechanism in the form of scale shown includes a tare beam 6 and a capacity beam 7, and the automatic load-offsetting mechanism consists of a pair of oppositely swinging pendulums 8 and 9 to which is operatively connected an indicator hand 10 which co-operates with a dial 11. The specific scale shown and above described is not per se a part of this invention and it is, therefore, shown and described only in such detail as is considered advisable in order that the operation of the scale testing device may be clearly understood.

The scale testing device is connected to the scale base 1 by means of a yoke 11 and a pair of hook rods 12 which, as is most clearly shown in Figure IV, pass through slots 13 in the yoke 11 and are adjustably secured thereto by means of substantially cylindrical rocking members 14, which seat in depressions 15 in the yoke member, and wing nuts 16.

In order that the testing device may fit scales having narrow platforms and bases, such as scales of the class known as person weighers, the yoke is provided with an additional pair of slots 17 and depressions 18. When it is desired to employ the device for testing a scale with a narrow base, the hook rods 12 with their wing nuts 16 and rocking members 14 are withdrawn from the slots 13 at the ends of the yoke and placed in the slots 17.

At the center of the yoke 11 is a universally mounted bearing 19 having a downwardly opening V-groove which is engaged by the upturned knife edge of a pivot 20 fixed by any suitable means, such as the set screws 21 shown in Figure V, to the bifurcated end 22 of a beam 23. The beam 23 is also provided with a knife edge pivot 24 having a downwardly turned edge engaging bearings supported by a stand 25 which is placed upon the platform 2 of the scale to be tested. From a pivot 26 at the outer or free end of the beam 23 is suspended a pan 27 adapted to support test weights 28. The distances between the pivots 20 and 24 and 20 and 26 are such that when a 1 lb. test weight is added to the pan 27 the pressure exerted by the stand 25 on the platform 2 is increased by 10 lbs. The beam 23 is also equipped with a slidable poise 29 by means of which the pressure exerted by the stand 25 on the platform 2 may be increased 10 lbs.

The weight of the device is such and is so distributed that when it is placed upon a scale with the poise 29 in zero position and the pan 27 removed, the pressure exerted by the stand 25 on the platform 2 is 30 lbs. The pan 27 is sealed to a weight of 1 lb. so that when it is hung upon the beam the pressure exerted by the stand 25 on the platform 2 is 40 lbs. When a 1 lb. weight 28 is added to the pan 27 the pressure exerted on the platform 2 is 50 lbs. If the scale be properly adjusted, this weight will be registered on the dial 11, as shown in Figure I. As weights are added to the pan 27, the platform 2 is depressed. The beam 23 is maintained in substantially level condition while the scale is being tested by screwing down the wing nuts 16 as the platform 2 is forced downwardly, and the condition of level of the beam may be learned at any time by a glance at the level 30, which is fixed upon the beam 23. Since as many as thirty 1 lb. weights are carried by sealers and scale service men for the purpose of testing counter scales, it will be seen that the device of my invention makes it possible to test scales having a dial capacity of over 300 lbs. with little additional paraphernalia. Tare beams and capacity beams, such as the beams 6 and 7 shown in Figure I, may, of course, be separately tested by the use of my device. The capacity of a beam is seldom greater than the automatic capacity of the scale on which the beam is employed.

In the form of device shown in Figures VI and VII, the beam is extensible, so that scales of even greater capacity may be tested. As will be apparent from inspection of Figure VII, the main section 23$^a$ is channeled and a supplemental section 31$^a$ is telescoped therein, being retained in the channel by plates 32$^a$ and 33$^a$. When the beam is unextended the sections 23$^a$ and 31$^a$ are held in proper relative positions by means of a pin 34$^a$ which is inserted in registering openings in the rear ends of the beam sections and the plate 32$^a$. The supplemental beam section 31$^a$ contains an additional opening 35$^a$ which, when the beam is extended, is brought into registration with openings 36$^a$ and 37$^a$ located respectively in the forward end of the beam section 23$^a$ and in the plate 33$^a$. When the beam is to be extended the pin 34$^a$ is withdrawn, the openings 35$^a$, 36$^a$ and 37$^a$ are brought into registration, and the pin 34$^a$ is inserted therein. With the beam unextended, the testing device has the same multiplication as that shown in Figures I and II and it is used in the same way. With the beam extended, however, the multiplication of the pan and the 1 lb. weights thereon is increased by one-half, so that the pressure on the platform caused by the pan and by half of the weights is 15 lbs. instead of 10. The extensible beam, therefore, increases the capacity of the testing device by approximately 50%.

In Figure VIII I have shown the testing device as employed for testing an overhead track scale. When the device is so employed, the fulcrum pivot 20 is connected to the floor by means of a connecting link 12$^b$ and the stand 25 is connected to the overhead track by means of a link 40$^b$, having a turn buckle so that the level of the beam can be properly adjusted, and a chain 41$^b$ which is suitable for attachment to a hook 42$^b$ of a standard meat conveying trolley such as are well known and widely used in abattoirs. With the testing device so connected to the scale, the beam 23 may be leveled by means of the turn buckle 39$^b$ and the scale tested by placing weights in the pan 27 and noting the indication on the dial, in the manner in which platform scales are tested.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a scale testing device, in combination, a beam lever, a supporting frame therefor adapted to rest upon the platform of the scale to be tested, a pan carried by said beam lever adapted to receive a plurality of test weights, means for anchoring the beam lever to the scale to be tested and means whereby said anchoring means may be adjusted to keep said beam lever horizontal as the platform moves under load.

2. In a scale testing device, in combination, a supporting stand adapted to rest upon the platform of the scale to be tested, a beam lever pivoted thereto, means carried by said lever for receiving test weights, and anchoring means for one end of said lever comprising a platform spanning yoke and tension rods.

3. In a scale testing device, in combination, a supporting stand adapted to rest upon the platform of the scale to be tested, a beam lever pivoted thereto, means carried by said lever for receiving test weights, and anchoring means for one end of said lever comprising a platform spanning yoke and tension rods, said rods having hooks adapted to engage the frame of a scale.

4. In a scale testing device, in combination, a supporting stand adapted to rest upon the platform of the scale to be tested, a beam lever pivoted thereto, means carried by said lever for receiving test weights, and anchoring means for one end of said lever comprising a yoke and tension rods, said rods having hooks adapted to engage the frame of a scale, the lengths of said tension rods being adjustable.

5. In a scale testing device, in combination, a supporting stand adapted to rest upon the platform of the scale to be tested, a beam lever pivoted thereto, means carried by said lever for receiving test weights, and anchoring means for one end of said lever comprising a yoke and tension rods, the effective length of said yoke being adjustable to fit scales of varying shapes and sizes.

6. In a scale testing device, in combination, a supporting stand adapted to rest upon the platform of the scale to be tested, a beam lever pivoted thereto, means carried by said lever for receiving test weights, and anchoring means for one end of said lever comprising a yoke and tension rods, said tension rods being selectively engageable with said yoke at a plurality of points, thereby rendering the device adjustable to fit scales of various shapes and sizes.

7. In a scale testing device, in combination, a supporting stand adapted to rest upon the platform of the scale to be tested, a beam lever pivoted thereto, means carried by said lever for receiving test weights, anchoring means for one end of said lever comprising a yoke and tension rods, and means for adjusting the level of said lever.

8. A device for testing scales comprising, in combination, a supporting stand adapted to be supported by the scale platform, a beam pivoted thereto, adjustable means for anchoring one end of said beam, and means for varying the power arm of the lever, comprising an auxiliary beam slidably carried by the main beam and movable into several positions relative thereto and a poise pan carried by said auxiliary beam.

9. A device for testing scales comprising, in combination, a supporting stand adapted to be supported by the scale plateform, a beam pivoted thereto, adjustable means for anchoring one end of said beam, means for varying the power arm of the lever, comprising an auxiliary beam slidably carried by the main beam and movable into several positions relative thereto, and means for locking said auxiliary beam in adjusted position.

10. In a device for testing scales, in combination, a frame adapted to be supported by the platform of the scale to be tested, a beam lever pivoted thereto, anchoring means for said beam lever, an auxiliary beam carried by the beam lever, a pan carried by the auxiliary lever for receiving test weights, and means for moving the beams relative to each other to vary the length of the power arm and thus vary the effective downward pressure of the frame upon the scale platform.

11. A device for testing overhead track scales, comprising, in combination, beam weighing mechanism, comprising a beam lever and a pan supported by said beam lever for receiving test weights, means for anchoring the beam weighing mechanism, means for connecting the beam weighing mechanism to the device to be tested to exert a downward pull thereon, and adjusting means for leveling the beam weighing mechanism.

HALVOR O. HEM.